_(12)_ United States Patent
Yang (10) Patent No.: US 10,788,881 B2
(45) Date of Patent: Sep. 29, 2020

(54) TERMINAL-BASED WAKELOCK CONTROL METHOD AND APPARATUS AND TERMINAL

(71) Applicant: Huawei Technologies Co., Ltd., Shenzhen (CN)

(72) Inventor: Qinghua Yang, Beijing (CN)

(73) Assignee: HUAWEI TECHNOLOGIES CO., LTD., Shenshen (CN)

( * ) Notice: Subject to any disclaimer, the term of this patent is extended or adjusted under 35 U.S.C. 154(b) by 212 days.

(21) Appl. No.: 15/772,349

(22) PCT Filed: Oct. 29, 2015

(86) PCT No.: PCT/CN2015/093204
§ 371 (c)(1),
(2) Date: Apr. 30, 2018

(87) PCT Pub. No.: WO2017/070894
PCT Pub. Date: May 4, 2017

(65) Prior Publication Data
US 2018/0321733 A1  Nov. 8, 2018

(51) Int. Cl.
*G06F 9/46* (2006.01)
*G06F 1/3234* (2019.01)
(Continued)

(52) U.S. Cl.
CPC .......... *G06F 1/3234* (2013.01); *G06F 1/3203* (2013.01); *G06F 1/3206* (2013.01);
(Continued)

(58) Field of Classification Search
CPC .... G06F 1/3234; G06F 1/3228; G06F 21/629; G06F 1/3203; G06F 1/3206; G06F 9/485;
(Continued)

(56) References Cited

U.S. PATENT DOCUMENTS 8,769,676 B1 * 7/2014 Kashyap ............... G06F 21/554
726/22
9,229,522 B1 * 1/2016 Tian ....................... G06F 9/4418
(Continued)

FOREIGN PATENT DOCUMENTS

CN       103324519 A    9/2013
CN       103402027 A    11/2013
(Continued)

OTHER PUBLICATIONS

Banerjee, Abhijeet, et al. "Detecting energy bugs and hotspots in mobile apps." Proceedings of the 22nd ACM SIGSOFT International Symposium on Foundations of Software Engineering. ACM. (Year: 2014).*
(Continued)

Primary Examiner — Adam Lee
(74) Attorney, Agent, or Firm — Conley Rose, P.C.

(57) ABSTRACT

A terminal-based wakelock control method and apparatus, and a terminal, where the method includes obtaining a first application program that runs in the background, determining whether the first application program meets a preset filter criterion, selecting a first application program that does not meet the preset filter criterion to obtain a second application program, and forcibly releasing a wakelock held by the second application program and a service called by the second application program.

17 Claims, 5 Drawing Sheets

(51) Int. Cl.
*H04W 52/02* (2009.01)
*G06F 9/48* (2006.01)
*G06F 1/3206* (2019.01)
*G06F 1/3203* (2019.01)
*G06F 21/62* (2013.01)
*G06F 1/3228* (2019.01)

(52) U.S. Cl.
CPC .......... *G06F 1/3228* (2013.01); *G06F 1/3265* (2013.01); *G06F 9/485* (2013.01); *G06F 21/629* (2013.01); *H04W 52/0264* (2013.01); *H04W 52/0251* (2013.01); *Y02D 10/153* (2018.01)

(58) Field of Classification Search
CPC ...... G06F 1/3265; G06F 9/4418; G06F 1/329; G06F 9/44; H04W 52/0264; H04W 52/0251; Y02D 10/153
See application file for complete search history.

(56) References Cited

U.S. PATENT DOCUMENTS

| | | | |
|---|---|---|---|
| 9,351,254 B2* | 5/2016 | Backholm | H04W 52/0251 |
| 9,648,564 B1* | 5/2017 | Cui | H04W 52/0222 |
| 9,769,756 B1* | 9/2017 | Cui | H04W 52/0222 |
| 9,970,966 B2* | 5/2018 | Chen | G06F 11/3062 |
| 10,423,514 B1* | 9/2019 | Padidar | G06F 11/3457 |
| 2011/0040989 A1* | 2/2011 | Keyes | G06F 1/1626 |
| | | | 713/300 |
| 2012/0209923 A1* | 8/2012 | Mathur | G06F 21/53 |
| | | | 709/206 |
| 2012/0291102 A1* | 11/2012 | Cohen | G06F 21/57 |
| | | | 726/4 |
| 2013/0268257 A1* | 10/2013 | Hu | G06F 17/5009 |
| | | | 703/22 |
| 2014/0380283 A1* | 12/2014 | Hu | G06F 11/3604 |
| | | | 717/132 |
| 2015/0095682 A1* | 4/2015 | Lim | G06F 1/3206 |
| | | | 713/323 |
| 2015/0143151 A1* | 5/2015 | Yun | H04N 5/63 |
| | | | 713/323 |
| 2015/0208352 A1* | 7/2015 | Backholm | H04W 52/0251 |
| | | | 455/574 |
| 2015/0234442 A1* | 8/2015 | Emami | G06F 1/3228 |
| | | | 713/323 |
| 2016/0048682 A1 | 2/2016 | Gou et al. | |
| 2016/0095056 A1* | 3/2016 | Lebon-Schneider | |
| | | | H04W 52/028 |
| | | | 455/574 |
| 2017/0048801 A1* | 2/2017 | Choi | H04W 88/02 |

FOREIGN PATENT DOCUMENTS

| | | |
|---|---|---|
| CN | 103885565 A | 6/2014 |
| CN | 104038635 A | 9/2014 |
| CN | 104156053 A | 11/2014 |
| CN | 104298549 A | 1/2015 |
| CN | 104731302 A | 6/2015 |
| EP | 2977854 A1 | 1/2016 |
| WO | 2014201945 A1 | 12/2014 |
| WO | 2015126647 A1 | 8/2015 |

OTHER PUBLICATIONS

Kim, Kwanghwan, and Hojung Cha. "WakeScope: runtime WakeLock anomaly management scheme for Android platform." Proceedings of the Eleventh ACM International Conference on Embedded Software. IEEE Press. (Year: 2013).*
Martins, Marcelo, Justin Cappos, and Rodrigo Fonseca. "Selectively taming background android apps to improve battery lifetime." 2015 {USENIX} Annual Technical Conference ({USENIX}{ATC} 15). (Year: 2015).*
Pathak, Abhinav, et al. "What is keeping my phone awake?: characterizing and detecting no-sleep energy bugs in smartphone apps." Proceedings of the 10th international conference on Mobile systems, applications, and services. ACM. (Year: 2012).*
Pathak, Abhinav, Y. Charlie Hu, and Ming Zhang. "Where is the energy spent inside my app?: fine grained energy accounting on smartphones with eprof." Proceedings of the 7th ACM european conference on Computer Systems. ACM. (Year: 2012).*
Vekris, Panagiotis, et al. "Towards verifying android apps for the absence of no-sleep energy bugs." Presented as part of the 2012 Workshop on Power-Aware Computing and Systems. (Year: 2012).*
Wang, Xigui, Xianfeng Li, and Wen Wen. "Wlcleaner: Reducing energy waste caused by wakelock bugs at runtime." 2014 IEEE 12th International Conference on Dependable, Autonomic and Secure Computing. IEEE. (Year: 2014).*
Zhang, Jack, Ayemi Musa, and Wei Le. "A comparison of energy bugs for smartphone platforms." 2013 1st international workshop on the engineering of mobile-enabled systems (MOBS). IEEE. (Year: 2013).*
Liu et al. "GreenDroid: Automated Diagnosis of Energy Inefficiency for Smartphone Applications". IEEE Transactions on Software Engineering (vol. 40, Issue: 9, pp. 911-940). (Year: 2014).*
Kwanghwan, K., et al., "WakeScope: Runtime WakeLock Anomaly Management Scheme for Android Platform," XP032524804, Proceedings of the International Conference on Embedded Software, Sep. 29, 2013, 10 pages.
Foreign Communication From a Counterpart Application, European Application No. 15906958.2, Extended European Search Report dated Oct. 8, 2018, 10 pages.
Foreign Communication From a Counterpart Application, Japanese Application No. 2018-522123, Japanese Office Action dated Aug. 27, 2019, 4 pages.
Foreign Communication From a Counterpart Application, Japanese Application No. 2018-522123, English Translation of Japanese Office Action dated Aug. 27, 2019, 3 pages.
Machine Translation and Abstract of Chinese Publication No. CN104731302, Jun. 24, 2015, 22 pages.
Foreign Communication From a Counterpart Application, Chinese Application No. 201580042100.3, Chinese Office Action dated Dec. 4, 2018, 5 pages.
Machine Translation and Abstract of Chinese Publication No. CN103402027, Nov. 20, 2013, 8 pages.
Machine Translation and Abstract of Chinese Publication No. CN103885565, Jun. 25, 2014, 13 pages.
Machine Translation and Abstract of Chinese Publication No. CN104038635, Sep. 10, 2014, 10 pages.
Machine Translation and Abstract of Chinese Publication No. CN104156053, Nov. 19, 2014, 12 pages.
Machine Translation and Abstract of Chinese Publication No. CN104298549, Jan. 21, 2015, 20 pages.
Foreign Communication From a Counterpart Application, PCT Application No. PCT/CN2015/093204, English Translation of International Search Report dated Jul. 18, 2016, 2 pages.
Foreign Communication From a Counterpart Application, PCT Application No. PCT/CN2015/093204, English Translation of Written Opinion dated Jul. 18, 2016, 5 pages.

* cited by examiner

TERMINAL-BASED WAKELOCK CONTROL METHOD AND APPARATUS AND TERMINAL

CROSS-REFERENCE TO RELATED APPLICATIONS

This application is a U.S. National Stage of International Patent Application No. PCT/CN2015/093204 filed on Oct. 29, 2015, which is hereby incorporated by reference in its entirety.

TECHNICAL FIELD

The present disclosure relates to the field of terminal technologies, and in particular, to a terminal-based wakelock control apparatus and apparatus, and a terminal.

BACKGROUND

An ANDROID system is an operating system that is widely applied to terminals at present. A user usually sets multiple application programs on a terminal. To ensure that the application programs set on the terminal run properly, the ANDROID system provides a wakelock mechanism. The application programs set on the terminal may apply for wakelocks from the ANDROID system. The ANDROID system allocates wakelocks to the application programs and services called by the application programs. Provided that a quantity of held wakelocks is greater than 0, the ANDROID system cannot enter a sleep state. That is, the ANDROID system can enter a sleep state only when any application program set on the terminal and a service called by the application program do not hold a wakelock.

To prevent the ANDROID system from entering a sleep state, many application programs and services called by the application programs inappropriately hold wakelocks. For example, a game application program still holds a wakelock during long-time background running, an updating service called by an electronic book application program holds a wakelock for a long time. Because an application program and a service called by the application program inappropriately hold a wakelock for a long time, a screen-off standby current increases from over 10 milliamperes to tens of milliamperes or even over 100 milliamperes. This increases energy consumption of the terminal and excessively occupies system resources.

SUMMARY

Embodiments of the present disclosure provide a terminal-based wakelock control method and apparatus, and a terminal in order to resolve a problem that energy consumption of a terminal increases and system resources are excessively occupied because an application program and a service called by the application program inappropriately hold a wakelock for a long time.

According to a first aspect, an embodiment of the present disclosure provides a terminal-based wakelock control method, including obtaining a first application program that runs in the background, determining whether the first application program meets a preset filter criterion, selecting a first application program that does not meet the preset filter criterion, to obtain a second application program, and forcibly releasing a wakelock held by the second application program and a service called by the second application program.

With reference to the first aspect, in a first possible implementation of the first aspect, the preset filter criterion includes preset duration, a preset application scenario list, and a blacklist, and determining whether the first application program meets a preset filter criterion includes collecting statistics on background running duration of the first application program, and determining whether the background running duration of the first application program exceeds the preset duration, determining an application scenario of the first application program according to an interface called by the first application program, and comparing the application scenario of the first application program with the preset application scenario list, comparing the first application program with the blacklist, and determining that the first application program whose background running duration exceeds the preset duration and whose application scenario is neither saved in the preset application scenario list nor saved in the blacklist does not meet the preset filter criterion.

With reference to the first possible implementation of the first aspect, in a second possible implementation of the first aspect, the method further includes determining that the first application program whose background running duration is less than the preset duration and whose application scenario is saved in the preset application scenario list or is saved in the blacklist meets the preset filter criterion.

With reference to the first aspect, the first possible implementation of the first aspect, or the second possible implementation of the first aspect, in a third possible implementation of the first aspect, before the forcibly releasing a wakelock held by the second application program and a service called by the second application program, the method further includes saving characteristic information of the wakelock held by the second application program and the service called by the second application program, where the characteristic information includes an identifier corresponding to the second application program, and after the forcibly releasing a wakelock held by the second application program and a service called by the second application program, the method further includes setting the second application program to an agent lock state.

With reference to the third possible implementation of the first aspect, in a fourth possible implementation of the first aspect, the method further includes recording the wakelock application request in the characteristic information that includes the identifier of the second application program, and skip executing the wakelock application request if the wakelock application request carrying the identifier of the second application program is received, recording the wakelock change request in the characteristic information that includes the identifier of the second application program, and skip executing the wakelock change request if the wakelock change request carrying the identifier of the second application program is received, or deleting the characteristic information that includes the identifier of the second application program, and skip executing the wakelock deletion request if the wakelock deletion request carrying the identifier of the second application program is received.

With reference to the third possible implementation of the first aspect, in a fifth possible implementation of the first aspect, the method further includes determining whether the second application program meets a forcible restoration criterion, forcibly restoring, according to the characteristic information that includes the identifier of the second application program, the wakelock held by the second application program and the service called by the second application program if the second application program meets the forcible restoration criterion, and canceling the agent lock state of the second application program.

With reference to the fifth possible implementation of the first aspect, in a sixth possible implementation of the first aspect, the forcible restoration criterion includes foreground running or being called, and determining whether the second application program meets a forcible restoration criterion further includes monitoring whether the second application program is switched to foreground running or whether the second application program is called, and determining that the second application program meets the forcible restoration criterion if it is detected that the second application program is switched to foreground running or that the second application program is called.

With reference to the sixth possible implementation of the first aspect, in a seventh possible implementation of the first aspect, the method further includes determining that the second application program does not meet the forcible restoration criterion if it is detected that the second application program is not switched to foreground running and that the second application program is not called.

According to a second aspect, an embodiment of the present disclosure provides a terminal-based wakelock control apparatus, including an obtaining module configured to obtain a first application program that runs in the background, a first judging module configured to determine whether the first application program meets a preset filter criterion, a selection module configured to select a first application program that does not meet the preset filter criterion to obtain a second application program, and a release module configured to forcibly release a wakelock held by the second application program and a service called by the second application program.

With reference to the second aspect, in a first possible implementation of the second aspect, the preset filter criterion includes preset duration, a preset application scenario list, and a blacklist, and the first judging module is configured to determine whether the first application program meets the preset filter criterion and is further configured to collect statistics on background running duration of the first application program, and determine whether the background running duration of the first application program exceeds the preset duration, determine an application scenario of the first application program according to an interface called by the first application program, and compare the application scenario of the first application program with the preset application scenario list, compare the first application program with the blacklist, and determine that the first application program whose background running duration exceeds the preset duration and whose application scenario is neither saved in the preset application scenario list nor saved in the blacklist does not meet the preset filter criterion.

With reference to the first possible implementation of the second aspect, in a second possible implementation of the second aspect, the apparatus further includes a determining module configured to determine that the first application program whose background running duration is less than the preset duration and whose application scenario is saved in the preset application scenario list or is saved in the blacklist meets the preset filter criterion.

With reference to the second aspect, the first possible implementation of the second aspect, or the second possible implementation of the second aspect, in a third possible implementation of the second aspect, the apparatus further includes a storage module configured to save characteristic information of the wakelock held by the second application program and the service called by the second application program before the release module forcibly releases the wakelock held by the second application program and the service called by the second application program, where the characteristic information includes an identifier corresponding to the second application program, and a setting module configured to set the second application program to an agent lock state after the release module forcibly releases the wakelock held by the second application program and the service called by the second application program.

With reference to the third possible implementation of the second aspect, in a fourth possible implementation of the second aspect, the apparatus further includes a processing module configured to record the wakelock application request in the characteristic information that includes the identifier of the second application program, and skip executing the wakelock application request if the wakelock application request carrying the identifier of the second application program is received, record the wakelock change request in the characteristic information that includes the identifier of the second application program, and skip executing the wakelock change request if the wakelock change request carrying the identifier of the second application program is received, or delete the characteristic information that includes the identifier of the second application program, and skip executing the wakelock deletion request if the wakelock deletion request carrying the identifier of the second application program is received.

With reference to the third possible implementation of the second aspect, in a fifth possible implementation of the second aspect, the apparatus further includes a second judging module configured to determine whether the second application program meets a forcible restoration criterion, a restoration module configured to forcibly restore, according to the characteristic information that includes the identifier of the second application program, the wakelock held by the second application program and the service called by the second application program if the second application program meets the forcible restoration criterion, and a cancellation module configured to cancel the agent lock state of the second application program.

With reference to the fifth possible implementation of the second aspect, in a sixth possible implementation of the second aspect, the forcible restoration criterion includes foreground running or being called, and the second judging module is configured to determine whether the second application program meets the forcible restoration criterion and is further configured to monitor whether the second application program is switched to foreground running or whether the second application program is called, and determine that the second application program meets the forcible restoration criterion if it is detected that the second application program is switched to foreground running or that the second application program is called.

With reference to the sixth possible implementation of the second aspect, in a seventh possible implementation of the second aspect, the second judging module is further configured to determine that the second application program does not meet the forcible restoration criterion if it is detected that the second application program is not switched to foreground running and that the second application program is not called.

According to a third aspect, an embodiment of the present disclosure provides a terminal. The terminal includes a first processor configured to obtain a first application program that runs in the background, and a second processor configured to determine whether the first application program meets a preset filter criterion, select a first application program that does not meet the preset filter criterion to obtain a second application program, and forcibly release a wakelock held by the second application program and a service called by the second application program.

With reference to the third aspect, in a first possible implementation of the third aspect, the preset filter criterion includes preset duration, a preset application scenario list, and a blacklist, and the second processor is configured to determine whether the first application program meets the preset filter criterion and is further configured to collect statistics on background running duration of the first application program, and determine whether the background running duration of the first application program exceeds the preset duration, determine an application scenario of the first application program according to an interface called by the first application program, and compare the application scenario of the first application program with the preset application scenario list, compare the first application program with the blacklist, and determine that the first application program whose background running duration exceeds the preset duration and whose application scenario is neither saved in the preset application scenario list nor saved in the blacklist does not meet the preset filter criterion.

With reference to the first possible implementation of the third aspect, in a second possible implementation of the third aspect, the second processor is further configured to determine that the first application program whose background running duration is less than the preset duration and whose application scenario is saved in the preset application scenario list or is saved in the blacklist meets the preset filter criterion.

With reference to the third aspect, the first possible implementation of the third aspect, or the second possible implementation of the third aspect, in a third possible implementation of the third aspect, the second processor is further configured to save characteristic information of the wakelock held by the second application program and the service called by the second application program before the wakelock held by the second application program and the service called by the second application program is forcibly released, where the characteristic information includes an identifier corresponding to the second application program, and set the second application program to an agent lock state after the wakelock held by the second application program and the service called by the second application program is forcibly released.

With reference to the third possible implementation of the third aspect, in a fourth possible implementation of the third aspect, the second processor is further configured to record the wakelock application request in the characteristic information that includes the identifier of the second application program, and skip executing the wakelock application request if the wakelock application request carrying the identifier of the second application program is received, record the wakelock change request in the characteristic information that includes the identifier of the second application program, and skip executing the wakelock change request if the wakelock change request carrying the identifier of the second application program is received, or delete the characteristic information that includes the identifier of the second application program, and skip executing the wakelock deletion request if the wakelock deletion request carrying the identifier of the second application program is received.

With reference to the third possible implementation of the third aspect, in a fifth possible implementation of the third aspect, the second processor is further configured to determine whether the second application program meets a forcible restoration criterion, forcibly restore, according to the characteristic information that includes the identifier of the second application program, the wakelock held by the second application program and the service called by the second application program if the second application program meets the forcible restoration criterion, and cancel the agent lock state of the second application program.

With reference to the fifth possible implementation of the third aspect, in a sixth possible implementation of the third aspect, the forcible restoration criterion includes foreground running or being called, and the second processor is configured to determine whether the second application program meets the forcible restoration criterion and is further configured to monitor whether the second application program is switched to foreground running or whether the second application program is called, and determine that the second application program meets the forcible restoration criterion if it is detected that the second application program is switched to foreground running or that the second application program is called.

With reference to the sixth possible implementation of the third aspect, in a seventh possible implementation of the third aspect, the second processor is further configured to determine that the second application program does not meet the forcible restoration criterion if it is detected that the second application program is not switched to foreground running and that the second application program is not called.

It can be seen from the foregoing technical solutions that, embodiments of the present disclosure provide a terminal-based wakelock control method and apparatus, and a terminal. A first application program that runs in the background is obtained, it is determined whether the first application program meets a preset filter criterion, a first application program that does not meet the preset filter criterion is selected, to obtain a second application program, and a wakelock held by the second application program and a service called by the second application program is forcibly released. In this solution, it is first determined whether the first application program that runs in the background meets the preset filter criterion. Then, the first application program that does not meet the preset filter criterion is selected, to obtain the second application program. Finally, the wakelock held by the second application program and the service called by the second application program is forcibly released. Therefore, a wakelock held by a first application program that runs in the background and a service called by the first application program can be effectively controlled. This prevents a first application program that runs in the background and that does not meet a preset filter criterion and a service called by the first application program from inappropriately holding a wakelock for a long time, thereby reducing energy consumption of a terminal and reducing system resources.

BRIEF DESCRIPTION OF DRAWINGS

Accompanying drawings in the specification that form a part of the present application are used to provide further understanding of the present disclosure. Schematic embodiments of the present disclosure and descriptions of the embodiments are used to explain the present disclosure and do not constitute an inappropriate limitation on the present disclosure.

To describe the technical solutions in the embodiments of the present disclosure more clearly, the following briefly describes the accompanying drawings required for describing the embodiments. A person of ordinary skill in the art may still derive other drawings from these accompanying drawings without creative efforts.

DESCRIPTION OF EMBODIMENTS

Figure 1:
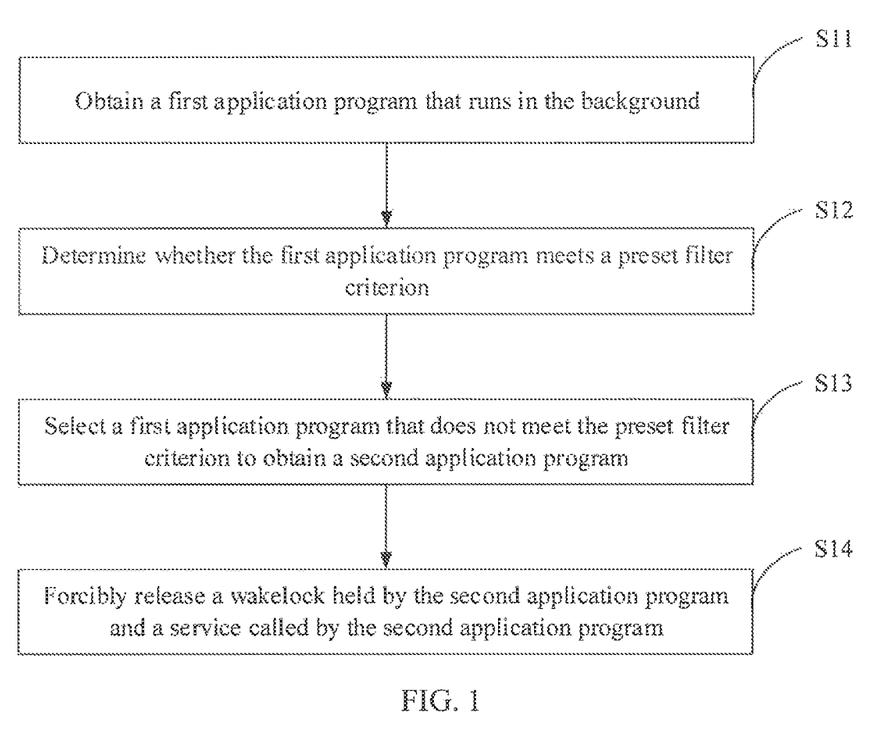
FIG. 1 is a flowchart of a terminal-based wakelock control method according to an embodiment of the present disclosure.

An embodiment of the present disclosure provides a terminal-based wakelock control method to resolve a problem that energy consumption of a terminal increases and system resources are excessively occupied because an application program and a service called by the application program inappropriately hold a wakelock for a long time. The method may be applied to a terminal. A process is shown in FIG. 1. The method includes the following steps.

Step S11: Obtain a first application program that runs in the background.

Generally, many application programs are set on a terminal. These application programs may run in the foreground, or may run in the background. Because application programs that run in the foreground are application programs that are currently being used by a user, that the application programs that run in the foreground and services called by the application programs hold wakelocks belongs to a case of appropriately holding a wakelock. These wakelocks cannot be forcibly released. Therefore, this embodiment is applicable to an application program that runs in the background. The application program that runs in the background is defined as the first application program. There may be one or more first application programs.

Step S12: Determine whether the first application program meets a preset filter criterion.

The preset filter criterion is preset according to an actual requirement. After the first application program that runs in the background on the terminal is obtained, it may be determined whether the first application program meets the preset filter criterion.

Step S13: Select a first application program that does not meet the preset filter criterion to obtain a second application program.

Among first application programs, there may be a first application program that meets the preset filter criterion, or there may be a first application program that does not meet the preset filter criterion. The first application program that does not meet the preset filter criterion is selected as the second application program.

Step S14: Forcibly release a wakelock held by the second application program and a service called by the second application program.

In a running process of the application programs set on the terminal, many services are called. In this case, both the application programs and the services called by the application programs may hold wakelocks.

Because the second application program runs in the background and does not meet the preset filter criterion, that is, that the second application program and the service called by the second application program hold the wakelock belongs to a case of inappropriately holding a wakelock, the wakelock held by the second application program and the service called by the second application program may be forcibly released.

In this solution, it is first determined whether a first application program that runs in the background meets a preset filter criterion. Then, a first application program that does not meet the preset filter criterion is selected, to obtain a second application program. Finally, a wakelock held by the second application program and a service called by the second application program is forcibly released. Therefore, a wakelock held by a first application program that runs in the background and a service called by the first application program can be effectively controlled. This prevents a first application program that runs in the background and that does not meet a preset filter criterion and a service called by the first application program from inappropriately holding a wakelock for a long time, thereby reducing energy consumption of a terminal and reducing system resources.

Figure 2:
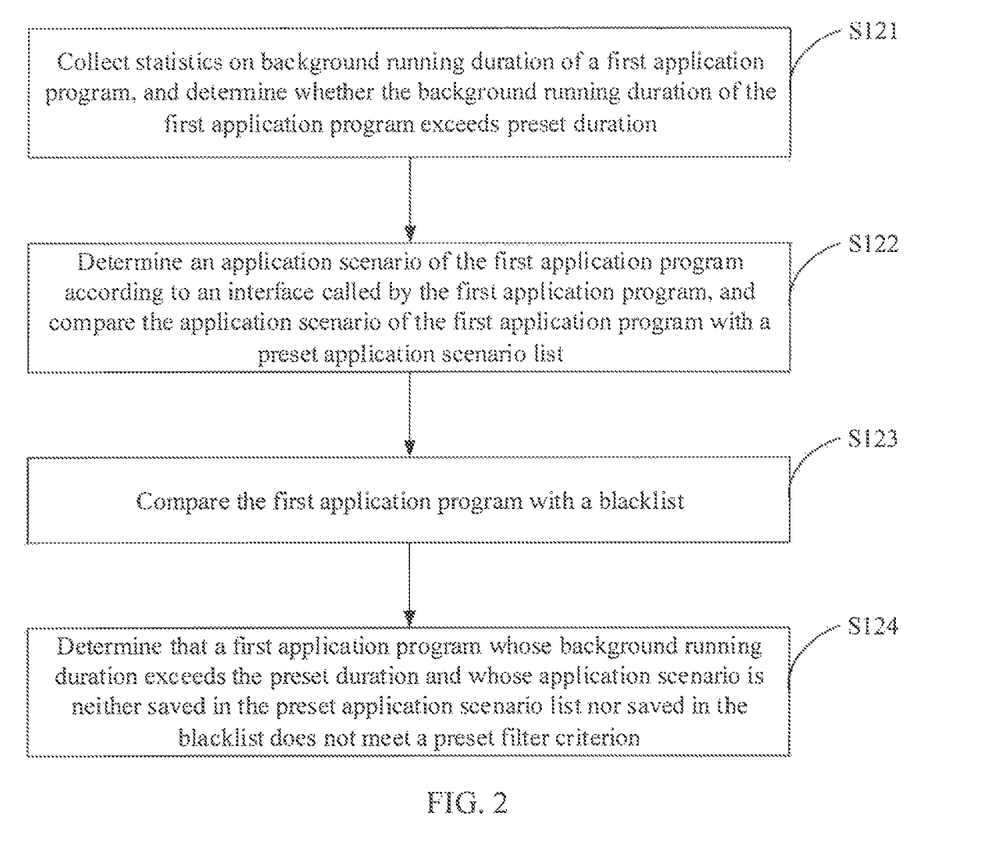
FIG. 2 is a flowchart of step S12 according to an embodiment of the present disclosure.

Further, the preset filter criterion may be set in multiple manners. In the following, an example in which the preset filter criterion includes preset duration, a preset application scenario list, and a blacklist is used for description. An implementation process of determining whether the first application program meets the preset filter criterion in the foregoing step S12 is shown in FIG. 2, and further includes the following steps.

Step S121: Collect statistics on background running duration of the first application program, and determine whether the background running duration of the first application program exceeds preset duration.

The background running duration of the first application program is duration in which the first application program is switched to background running from foreground running. If the first application program runs in the background for a long time, forcibly releasing a wakelock held by the first application program and a service called by the first application program may be taken into consideration. Therefore, for the first application program that runs in the background, statistics on the background running duration of the first application program may be collected. Then, it is determined whether the background running duration of the first application program exceeds the preset duration.

The preset duration may be set according to an actual requirement. For example, the preset duration may be set to 3 minutes, 5 minutes, or 10 minutes.

Step S122: Determine an application scenario of the first application program according to an interface called by the first application program, and compare the application scenario of the first application program with a preset application scenario list.

During foreground running or background running, the first application program may call an interface of an ANDROID system. The application scenario of the first application program, for example, audio playback or download, may be determined according to the interface called by the first application program. Some application scenarios are very important, and affect user experience after being interrupted. Therefore, important application scenarios may be obtained, to obtain the preset application scenario list.

After the application scenario of the first application program is determined, the application scenario of the first application program is compared with the preset application scenario list to determine whether the application scenario of the first application program is saved in the preset application scenario list.

Step S123: Compare the first application program with a blacklist.

Some application programs set on the terminal are very important. Forcibly releasing wakelocks held by the application programs severely affects user experience. Therefore, these important application programs may be obtained in advance to obtain the blacklist. Wakelocks held by application programs in the blacklist are prohibited from being forcibly released. The first application program is compared with the blacklist to determine whether the first application program is saved in the blacklist.

It should be noted that, there is no strict sequence among steps S121, S122, and S123. For example, step S121 may be first executed, then step S122 may be executed, and then step S123 may be executed, step S121 may be first executed, then step S123 may be executed, and then step S122 may be executed, or steps S121, S122, and S123 may be executed at the same time.

Step S124: Determine that the first application program whose background running duration exceeds the preset duration and whose application scenario is neither saved in the preset application scenario list nor saved in the blacklist does not meet the preset filter criterion.

In addition, it may be further determined that the first application program whose background running duration is less than the preset duration and whose application scenario is saved in the preset application scenario list or is saved in the blacklist meets the preset filter criterion.

The wakelock held by the first application program that does not meet the preset filter criterion (that is, the second application program) and the service called by the first application program may be forcibly released. A wakelock held by a first application program that meets the preset filter criterion and a service called by the first application program is retained.

Figure 3:
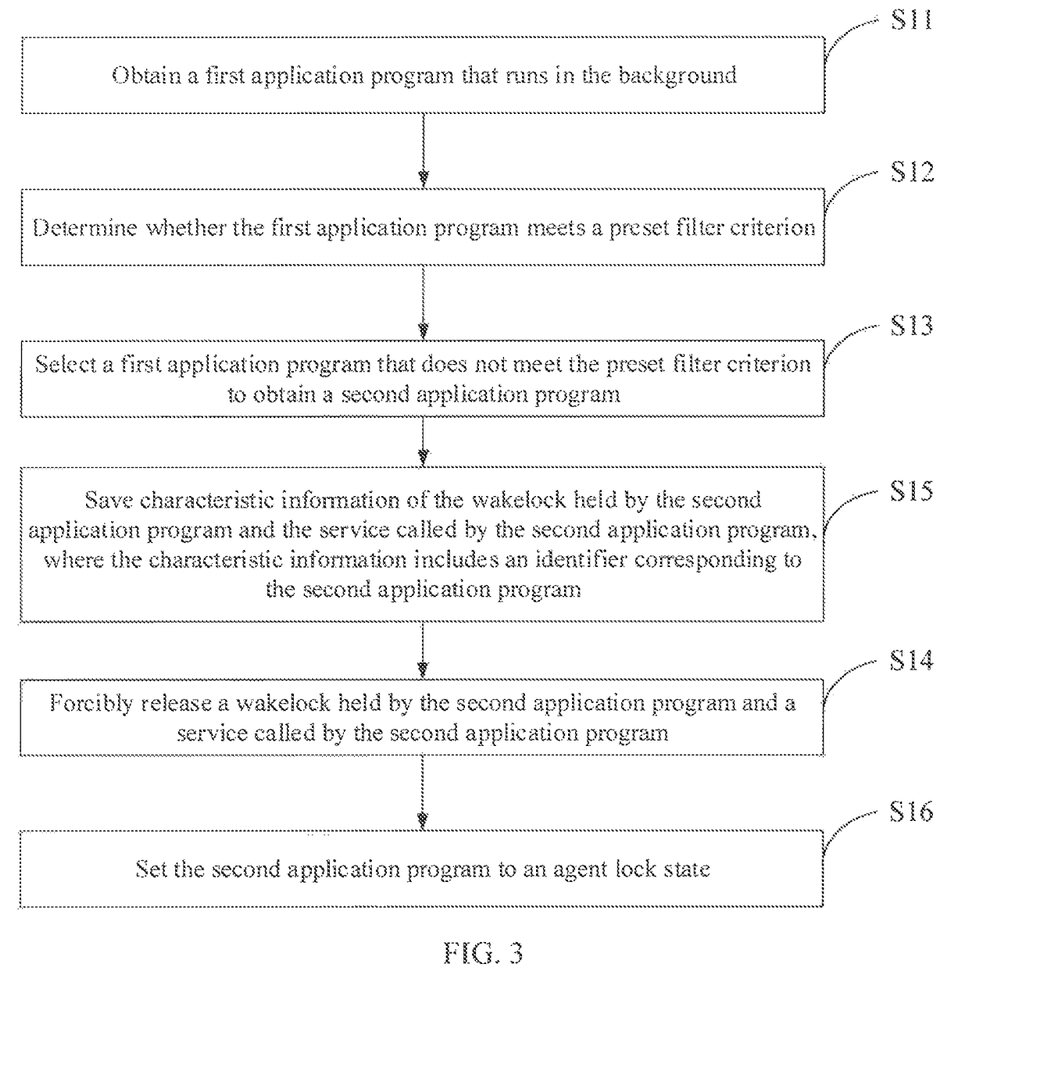
FIG. 3 is a flowchart of another terminal-based wakelock control method according to an embodiment of the present disclosure.

An embodiment of the present disclosure further provides another terminal-based wakelock control method. A process of the method is shown in FIG. 3. On a basis of the method shown in FIG. 1, the method further includes the following steps.

Step S15: Save characteristic information of the wakelock held by the second application program and the service called by the second application program, where the characteristic information includes an identifier corresponding to the second application program.

Before the wakelock held by the second application program and the service called by the second application program is forcibly released, the characteristic information of the wakelock held by the second application program and the service called by the second application program may be further saved. The characteristic information includes the identifier of the second application program to indicate that the characteristic information is related to the second application program. The wakelock characteristic information may include binding information, tag information, mark information, and the like.

Step S16: Set the second application program to an agent lock state.

After the wakelock held by the second application program and the service called by the second application program is forcibly released, the second application program may be further set to the agent lock state. Because the second application program is in the agent lock state, if a wakelock application, change, or deletion request for the second application program and the service called by the second application program is received, corresponding characteristic information is changed, but the corresponding request is not executed. For example, if a wakelock application request carrying the identifier of the second application program is received, the wakelock application request is recorded in the characteristic information that includes the identifier of the second application program, and the wakelock application request is not executed, if a wakelock change request carrying the identifier of the second application program is received, the wakelock change request is recorded in the characteristic information that includes the identifier of the second application program, and the wakelock change request is not executed, or if a wakelock deletion request carrying the identifier of the second application program is received, the characteristic information that includes the identifier of the second application program is deleted, and the wakelock deletion request is not executed.

Figure 4:
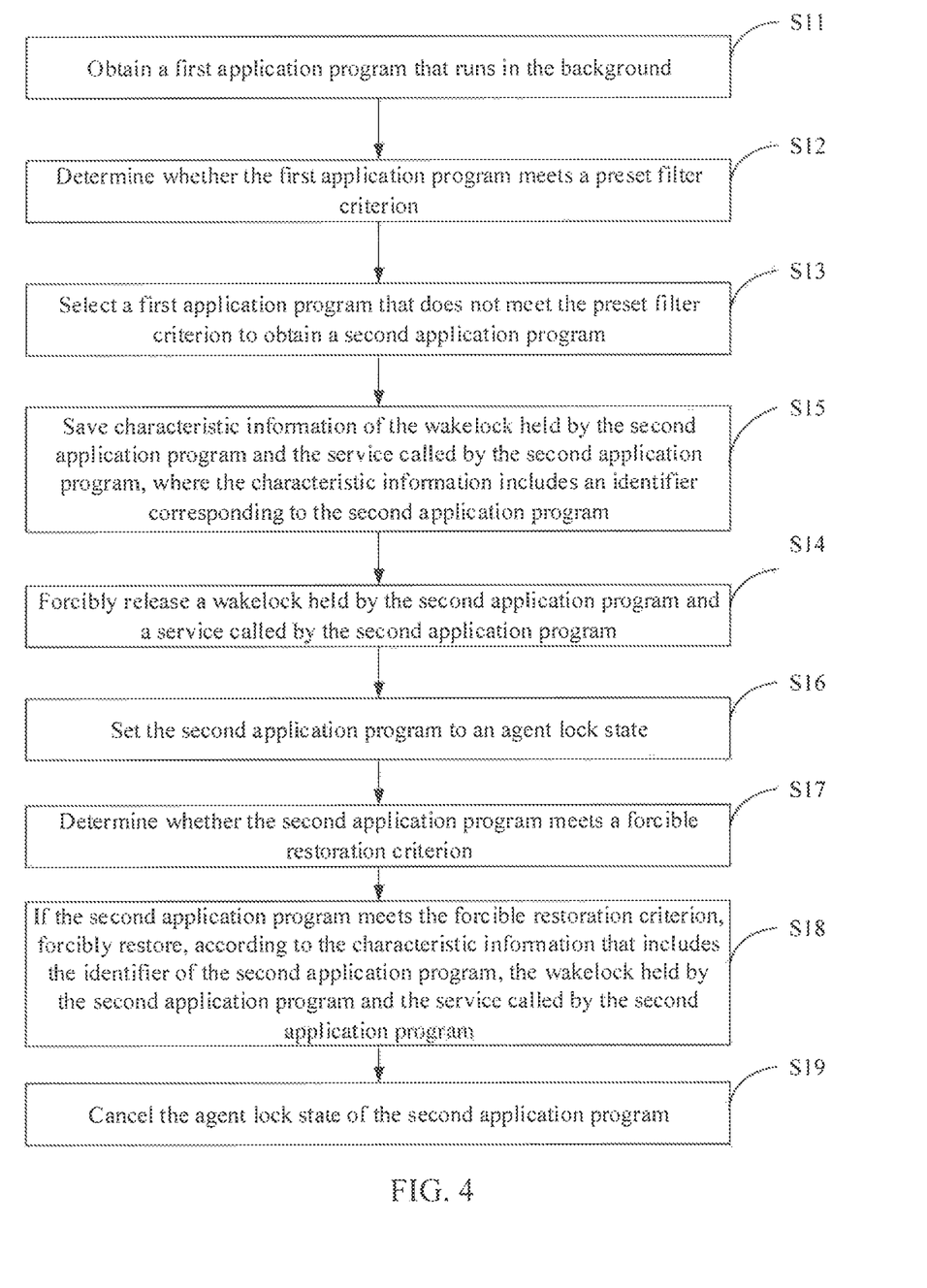
FIG. 4 is a flowchart of still another terminal-based wakelock control method according to an embodiment of the present disclosure.

An embodiment of the present disclosure further provides still another terminal-based wakelock control method. A process of the method is shown in FIG. 4. On a basis of FIG. 3, the method further includes the following steps.

Step S17: Determine whether the second application program meets a forcible restoration criterion.

When the second application program runs in the background and does not meet the preset filter criterion, the wakelock held by the second application program and the service called by the second application program is forcibly released. Correspondingly, when a running status of the second application program changes, the wakelock held by the second application program and the service called by the second application program needs to be forcibly restored.

In this case, it needs to be determined whether the second application program meets the forcible restoration criterion. The forcible restoration criterion may be set according to an actual requirement.

Step S18: If the second application program meets the forcible restoration criterion, forcibly restore, according to the characteristic information that includes the identifier of the second application program, the wakelock held by the second application program and the service called by the second application program.

Step S19: Cancel the agent lock state of the second application program.

Because the wakelock characteristic information is saved when the wakelock held by the second application program and the service called by the second application program is forcibly released, when the second application program meets the forcible restoration criterion, the wakelock held by the second application program and the service called by the second application program may be forcibly restored according to the characteristic information that includes the identifier of the second application program, and the agent lock state of the second application program may be canceled.

The forcible restoration criterion may be set in multiple manners. In the following, an example in which the forcible restoration criterion includes foreground running or being called is used to describe an implementation process of determining whether the second application program meets the forcible restoration criterion in the foregoing step S17. The implementation process is as follows. Monitoring whether the second application program is switched to foreground running or whether the second application program is called, and determining that the second application program meets the forcible restoration criterion if it is detected that the second application program is switched to foreground running or that the second application program is called, or determining that the second application program does not meet the forcible restoration criterion if it is detected that the second application program is not switched to foreground running and that the second application program is not called.

In the foregoing process, it may be determined whether the second application program meets the forcible restoration criterion in order to further determine whether to forcibly restore the wakelock held by the second application program and the service called by the second application program.

Figure 5:
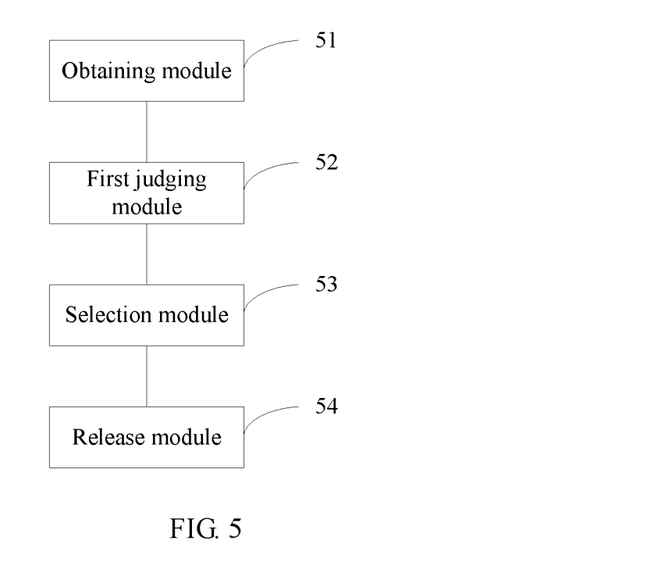
FIG. 5 is a schematic structural diagram of a terminal-based wakelock control apparatus according to an embodiment of the present disclosure.

Based on a same disclosure idea, an embodiment of the present application further provides a terminal-based wakelock control apparatus. The apparatus corresponds to the terminal-based wakelock control method shown in FIG. 1. A structure of the apparatus is shown in FIG. 5. The apparatus includes an obtaining module 51 configured to obtain a first application program that runs in the background, a first judging module 52 configured to determine whether the first application program meets a preset filter criterion, a selection module 53 configured to select a first application program that does not meet the preset filter criterion to obtain a second application program, and a release module 54 configured to forcibly release a wakelock held by the second application program and a service called by the second application program.

In this solution, it is first determined whether a first application program that runs in the background meets a preset filter criterion. Then, a first application program that does not meet the preset filter criterion is selected to obtain a second application program. Finally, a wakelock held by the second application program and a service called by the second application program is forcibly released. Therefore, a wakelock held by a first application program that runs in the background and a service called by the first application program can be effectively controlled. This prevents a first application program that runs in the background and that does not meet a preset filter criterion and a service called by the first application program from inappropriately holding a wakelock for a long time, thereby reducing energy consumption of a terminal and reducing system resources.

Further, the preset filter criterion includes preset duration, a preset application scenario list, and a blacklist. The first judging module 52 is configured to determine whether the first application program meets the preset filter criterion and is further configured to collect statistics on background running duration of the first application program, and determine whether the background running duration of the first application program exceeds the preset duration, determine an application scenario of the first application program according to an interface called by the first application program, and compare the application scenario of the first application program with the preset application scenario list, compare the first application program with the blacklist, and determine that the first application program whose background running duration exceeds the preset duration and whose application scenario is neither saved in the preset application scenario list nor saved in the blacklist does not meet the preset filter criterion.

Optionally, the foregoing apparatus further includes a determining module (not shown) configured to determine that the first application program whose background running duration is less than the preset duration and whose application scenario is saved in the preset application scenario list or is saved in the blacklist meets the preset filter criterion.

Optionally, the foregoing apparatus further includes a storage module (not shown) configured to, before the release module 54 forcibly releases the wakelock held by the second application program and the service called by the second application program, save characteristic information of the wakelock held by the second application program and the service called by the second application program, where the characteristic information includes an identifier corresponding to the second application program, and a setting module (not shown) configured to set the second application program to an agent lock state after the release module 54 forcibly releases the wakelock held by the second application program and the service called by the second application program.

Optionally, the foregoing apparatus further includes a processing module (not shown) configured to, if a wakelock application request carrying the identifier of the second application program is received, record the wakelock application request in the characteristic information that includes the identifier of the second application program, and skip executing the wakelock application request, if a wakelock change request carrying the identifier of the second application program is received, record the wakelock change request in the characteristic information that includes the identifier of the second application program, and skip executing the wakelock change request, or if a wakelock deletion request carrying the identifier of the second application program is received, delete the characteristic information that includes the identifier of the second application program, and skip executing the wakelock deletion request.

Optionally, the foregoing apparatus further includes a second judging module (not shown) configured to determine whether the second application program meets a forcible restoration criterion, a restoration module (not shown) configured to, if the second application program meets the forcible restoration criterion, forcibly restore, according to the characteristic information that includes the identifier of the second application program, the wakelock held by the second application program and the service called by the second application program, and a cancellation module (not shown) configured to cancel the agent lock state of the second application program.

Further, the forcible restoration criterion includes foreground running or being called. The second judging module is configured to determine whether the second application program meets the forcible restoration criterion and is further configured to monitor whether the second application program is switched to foreground running or whether the second application program is called, and if it is detected that the second application program is switched to foreground running or that the second application program is called, determine that the second application program meets the forcible restoration criterion.

Optionally, the second judging module is further configured to, if it is detected that the second application program is not switched to foreground running and that the second application program is not called, determine that the second application program does not meet the forcible restoration criterion.

Figure 6:
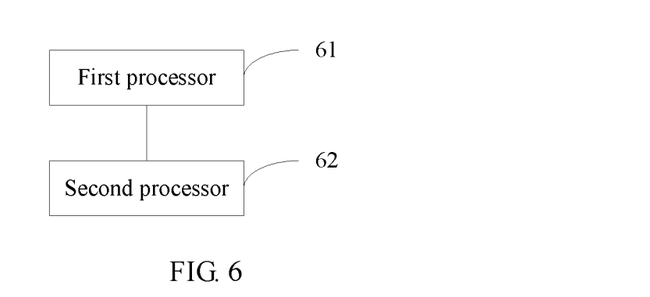
FIG. 6 is a schematic structural diagram of a terminal according to an embodiment of the present disclosure.

Based on the same disclosure idea, an embodiment of the present application further provides a terminal. The apparatus corresponds to the terminal-based wakelock control method shown in FIG. 1. A structure of the apparatus is shown in FIG. 6. The terminal includes a first processor 61 configured to obtain a first application program that runs in the background, and a second processor 62 configured to determine whether the first application program meets a preset filter criterion, select a first application program that does not meet the preset filter criterion, to obtain a second application program, and forcibly release a wakelock held by the second application program and a service called by the second application program.

In this solution, it is first determined whether a first application program that runs in the background meets a preset filter criterion. Then, a first application program that does not meet the preset filter criterion is selected to obtain a second application program. Finally, a wakelock held by the second application program and a service called by the second application program is forcibly released. Therefore, a wakelock held by a first application program that runs in the background and a service called by the first application program can be effectively controlled. This prevents a first application program that runs in the background and that does not meet a preset filter criterion and a service called by the first application program from inappropriately holding a wakelock for a long time, thereby reducing energy consumption of a terminal and reducing system resources.

Further, the preset filter criterion includes preset duration, a preset application scenario list, and a blacklist. The second processor 62 is configured to determine whether the first application program meets the preset filter criterion and is further configured to collect statistics on background running duration of the first application program, and determine whether the background running duration of the first application program exceeds the preset duration, determine an application scenario of the first application program according to an interface called by the first application program, compare the application scenario of the first application program with the preset application scenario list, compare the first application program with the blacklist, and determine that the first application program whose background running duration exceeds the preset duration and whose application scenario is neither saved in the preset application scenario list nor saved in the blacklist does not meet the preset filter criterion.

Optionally, the second processor 62 is further configured to determine that the first application program whose background running duration is less than the preset duration and whose application scenario is saved in the preset application scenario list or is saved in the blacklist meets the preset filter criterion.

Optionally, the second processor 62 is further configured to, before the wakelock held by the second application program and the service called by the second application program is forcibly released, save characteristic information of the wakelock held by the second application program and the service called by the second application program, where the characteristic information includes an identifier corresponding to the second application program, and set the second application program to an agent lock state after the wakelock held by the second application program and the service called by the second application program is forcibly released.

Optionally, the second processor 62 is further configured to, if a wakelock application request carrying the identifier of the second application program is received, record the wakelock application request in the characteristic information that includes the identifier of the second application program, and skip executing the wakelock application request, if a wakelock change request carrying the identifier of the second application program is received, record the wakelock change request in the characteristic information that includes the identifier of the second application program, and skip executing the wakelock change request, or if a wakelock deletion request carrying the identifier of the second application program is received, delete the characteristic information that includes the identifier of the second application program, and skip executing the wakelock deletion request.

Optionally, the second processor 62 is further configured to determine whether the second application program meets a forcible restoration criterion, if the second application program meets the forcible restoration criterion, forcibly restore, according to the characteristic information that includes the identifier of the second application program, the wakelock held by the second application program and the service called by the second application program, and cancel the agent lock state of the second application program.

Further, the forcible restoration criterion includes foreground running or being called. The second processor 62 is configured to determine whether the second application program meets the forcible restoration criterion and is further configured to monitor whether the second application program is switched to foreground running or whether the second application program is called, and if it is detected that the second application program is switched to foreground running or that the second application program is called, determine that the second application program meets the forcible restoration criterion.

Optionally, the second processor 62 is further configured to, if it is detected that the second application program is not switched to foreground running and that the second application program is not called, determine that the second application program does not meet the forcible restoration criterion.

The foregoing is the core idea of the present disclosure. To make a person skilled in the art understand the solutions in the present disclosure better, the following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

What is claimed is:

1. A terminal-based wakelock control method, comprising:
running a first application program in a background of the terminal;
determining that the first application program meets a preset filter criterion comprising:
determining that a duration of running the first application program in the background exceeds a preset duration;
determining an application scenario of the first application program based on an interface called by the first application program;
comparing the application scenario of the first application program with a preset application scenario list and determining that the application scenario of the first application program is not saved in the preset application scenario list; and
comparing the first application program to a blacklist and determining that the first application program is not saved in the blacklist;
selecting the first application program, wherein the selecting identifies a second application program associated with the first application program;
forcibly releasing a wakelock held by the second application program; and
forcibly releasing a wakelock held by a service called by the second application program.

2. The method of claim 1, wherein determining that the first application program meets the preset filter criterion comprises:
determining that the background running duration is less than or equal to the preset duration, the application scenario is saved in the preset application scenario list, and the first application program is saved in the blacklist.

3. The method of claim 1, further comprising:
setting the second application program to an agent lock state before forcibly releasing the wakelock held by the second application program and before forcibly releasing the wakelock held by the service called by the second application program;
saving characteristic information of the wakelock held by the second application program and the wakelock held by the service called by the second application program, wherein the characteristic information comprises an identifier of the second application program; and
after forcibly releasing the wakelock held by the second application program and after forcibly releasing the wakelock held by the service called by the second application program, cancelling the second application program agent lock state.

4. The method of claim 3, further comprising:
recording a wakelock application request in the characteristic information comprising the identifier of the second application program, and skipping execution of the wakelock application request when the wakelock application request carrying the identifier of the second application program is received;
recording a wakelock change request in the characteristic information comprising the identifier of the second application program, and skipping execution of the wakelock change request when the wakelock change request carrying the identifier of the second application program is received; and
deleting the characteristic information comprising the identifier of the second application program, and skipping execution of a wakelock deletion request when the wakelock deletion request carrying the identifier of the second application program is received.

5. The method of claim 3, further comprising:
determining when the second application program meets a forcible restoration criterion;
forcibly restoring, according to the characteristic information comprising the identifier of the second application program, the wakelock held by the second application program and forcibly restoring the wakelock held by the service called by the second application program when the second application program meets the forcible restoration criterion; and
cancelling the agent lock state of the second application program.

6. The method of claim 5, wherein determining whether the second application program meets the forcible restoration criterion comprises:
monitoring when the second application program is switched to running in the foreground of the terminal; and
determining that the second application program meets the forcible restoration criterion when it is detected that the second application program is switched to running in the foreground of the terminal.

7. The method of claim 6, further comprising determining that the second application program does not meet the forcible restoration criterion when it is detected that the second application program is not switched to running in the foreground of the terminal.

8. The method of claim 6, further comprising determining that the second application program does not meet the forcible restoration criterion when it is detected that the second application program is not switched to running in the foreground of the terminal.

9. The method of claim 5, wherein the forcible restoration criterion comprises the second application program service being called, and determining whether the second application program meets the forcible restoration criterion comprises:
monitoring whether the second application program service is called; and
determining that the second application program meets the forcible restoration criterion when it is detected that the second application program service is called.

10. A terminal, comprising:
a first processor configured to run first application program in a background of the terminal; and
a second processor coupled to the first processor and configured to:
determine that the first application program meets a preset filter criterion comprising:
determining that a duration of running the first application program in the background exceeds a preset duration;
determining an application scenario of the first application program based on an interface called by the first application program;
comparing the application scenario of the first application program with a preset application scenario list and determining that the application scenario of the first application program is not saved in the preset application scenario list; and
comparing the first application program to a blacklist and determining that the first application program is not saved in the blacklist;
select the first application program, wherein the selecting identifies a second application program associated with the first application program;
forcibly release a wakelock held by the second application program; and
forcibly release a wakelock held by a service called by the second application program.

11. The terminal of claim 10, wherein the second processor is further configured to determine that the first application program meets the preset filter criterion when the background running duration is less than or equal to the preset duration, the application scenario is saved in the preset application scenario list, and the first application program is saved in the blacklist.

12. The terminal of claim 10, wherein the second processor is further configured to determine that the first application program meets the preset filter criterion when the background running duration is less than or equal to the preset duration, the application scenario is saved in the preset application scenario list, and the first application program is saved in the blacklist.

13. The terminal of claim 10, wherein the second processor is further configured to:
    set the second application program to an agent lock state;
    save characteristic information of the wakelock held by the second application program and the wakelock held by the service called by the second application program before the wakelock held by the second application program and before the wakelock held by the service called by the second application program are forcibly released, wherein the characteristic information comprises an identifier of the second application program; and
    cancel the second application program agent lock state after the wakelock held by the second application program and after the wakelock held by the service called by the second application program are forcibly released.

14. The terminal of claim 13, wherein the second processor is further configured to:
    record a wakelock application request in the characteristic information comprising the identifier of the second application program;
    skip executing the wakelock application request when the wakelock application request carrying the identifier of the second application program is received;
    record a wakelock change request in the characteristic information comprising the identifier of the second application program;
    skip executing the wakelock change request when the wakelock change request carrying the identifier of the second application program is received;
    delete the characteristic information comprising the identifier of the second application program; and
    skip executing a wakelock deletion request when the wakelock deletion request carrying the identifier of the second application program is received.

15. The terminal of claim 13, wherein the second processor is further configured to:
    determine when the second application program meets a forcible restoration criterion;
    forcibly restore, according to the characteristic information comprising the identifier of the second application program, the wakelock held by the second application program and forcibly restore the wakelock held by the service called by the second application program when the second application program meets the forcible restoration criterion; and
    cancel the agent lock state of the second application program.

16. The terminal of claim 15, wherein the forcible restoration criterion comprises the second application program running in the foreground of the terminal or the second application program service being called, and when determining whether the second application program meets the forcible restoration criterion, the second processor being further configured to:
    monitor whether the second application program is switched to running in the foreground of the terminal or whether the second application program service is called; and
    determine that the second application program meets the forcible restoration criterion when it is detected that the second application program is switched to running in the foreground of the terminal or that the second application program service is called.

17. The terminal of claim 16, wherein the second processor is further configured to determine that the second application program does not meet the forcible restoration criterion when it is detected that the second application program is not switched to running in the foreground of the terminal and that the second application program service is not called.

* * * * *

UNITED STATES PATENT AND TRADEMARK OFFICE
CERTIFICATE OF CORRECTION

PATENT NO. : 10,788,881 B2
APPLICATION NO. : 15/772349
DATED : September 29, 2020
INVENTOR(S) : Qinghua Yang It is certified that error appears in the above-identified patent and that said Letters Patent is hereby corrected as shown below:

On the Title Page

Column 1, (73) Assignee: "Shenshen (CN)" should read "Shenzhen (CN)"

Signed and Sealed this
Tenth Day of November, 2020

Andrei Iancu
*Director of the United States Patent and Trademark Office*